US009581192B2

United States Patent
Hagiwara

(10) Patent No.: US 9,581,192 B2
(45) Date of Patent: Feb. 28, 2017

(54) DOUBLE-ROW TAPERED ROLLER BEARING UNIT AND METHOD FOR MANUFACTURING SAME

(71) Applicant: NSK Ltd., Shinagawa-ku, Tokyo (JP)

(72) Inventor: Nobuyuki Hagiwara, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/026,800

(22) PCT Filed: Sep. 30, 2014

(86) PCT No.: PCT/JP2014/076215
§ 371 (c)(1),
(2) Date: Apr. 1, 2016

(87) PCT Pub. No.: WO2015/050143
PCT Pub. Date: Apr. 9, 2015

(65) Prior Publication Data
US 2016/0245334 A1   Aug. 25, 2016

(30) Foreign Application Priority Data
Oct. 4, 2013   (JP) .................................. 2013-209026

(51) Int. Cl.
*F16C 19/38* (2006.01)
*B60B 35/02* (2006.01)
(Continued)

(52) U.S. Cl.
CPC .......... *F16C 19/386* (2013.01); *B60B 27/001* (2013.01); *B60B 27/0005* (2013.01);
(Continued)

(58) Field of Classification Search
CPC ...... F16C 19/386; F16C 33/366; F16C 33/58; F16C 35/063; B60B 27/001; B60B 27/0078; B60B 27/0084
See application file for complete search history.

(56) References Cited

U.S. PATENT DOCUMENTS 7,635,226 B2 *  12/2009  Norimatsu ............... B60B 27/00
                                                                 384/544
8,961,028 B2 *   2/2015  Beck ....................... F16C 35/06
                                                                 384/557

FOREIGN PATENT DOCUMENTS

JP      2000-130433 A    5/2000
JP      4019548 B2      12/2007
(Continued)

OTHER PUBLICATIONS

International Search Report (PCT/ISA/210) issued in PCT Application No. PCT/JP2014/076215 dated Jan. 13, 2015, with English translation (four (4) pages).

*Primary Examiner* — Thomas R. Hannon
(74) *Attorney, Agent, or Firm* — Crowell & Moring LLP

(57) ABSTRACT

Construction of a double-row tapered-roller bearing unit that is able to improve the contact state between the rolling contact surfaces of plural tapered rollers and a first inner-ring raceway (7) and second inner-ring raceway (8), and a method of manufacturing the same are provided. The inclination angle $\theta_1$ of the first inner-ring raceway (7) and the inclination angle $\theta_2$ of the second inner-ring raceway (8) in a state before the first inner ring (10) and the second inner ring (11) are press-fitted onto the fitting surface section (13a) of the hub main body (12a), the amount of decrease $\delta\theta_a$ in the inclination angle of the first inner-ring raceway (7) and the amount of decrease $\delta\theta_b$ in the inclination angle of the second inner-ring raceway (8) occurring due to press-fitting of the first inner ring (10) and the second inner ring (11) onto (Continued)

the fitting-surface section (13a), and the amount of increase $\delta\theta_k$ in the inclination angle of the first inner-ring raceway (7) occurring due to formation of the crimped section (15) are adjusted, so that the inclination angle $\phi_1$ of the first inner-ring raceway (7) and the inclination angle $\Theta_2$ of the second inner-ring raceway (8) in a state after the crimped section (15) has been formed are kept within respective proper ranges.

14 Claims, 8 Drawing Sheets

(51) Int. Cl.
*F16C 35/063* (2006.01)
*B60B 27/00* (2006.01)
*F16C 33/36* (2006.01)
*F16C 33/58* (2006.01)
*F16C 33/60* (2006.01)

(52) U.S. Cl.
CPC ...... *B60B 27/0078* (2013.01); *B60B 27/0084* (2013.01); *B60B 35/02* (2013.01); *F16C 33/366* (2013.01); *F16C 33/58* (2013.01); *F16C 35/063* (2013.01); *B60B 2380/14* (2013.01); *B60B 2380/64* (2013.01); *B60B 2380/73* (2013.01); *F16C 33/60* (2013.01); *F16C 2226/12* (2013.01); *F16C 2226/52* (2013.01); *F16C 2326/02* (2013.01); *F16C 2326/20* (2013.01)

(56) References Cited

FOREIGN PATENT DOCUMENTS

| | | |
|---|---|---|
| JP | 2008-2537 A | 1/2008 |
| JP | 2008-74155 A | 4/2008 |
| JP | 2008-256144 A | 10/2008 |

* cited by examiner

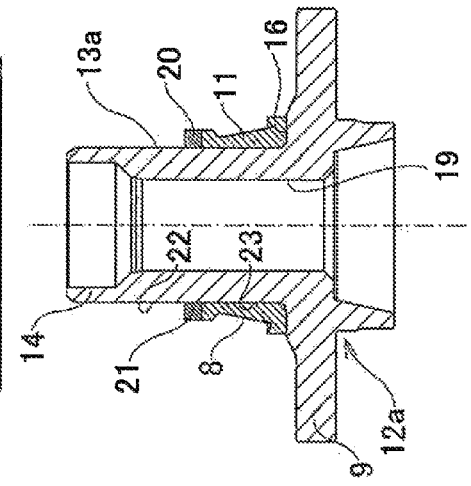
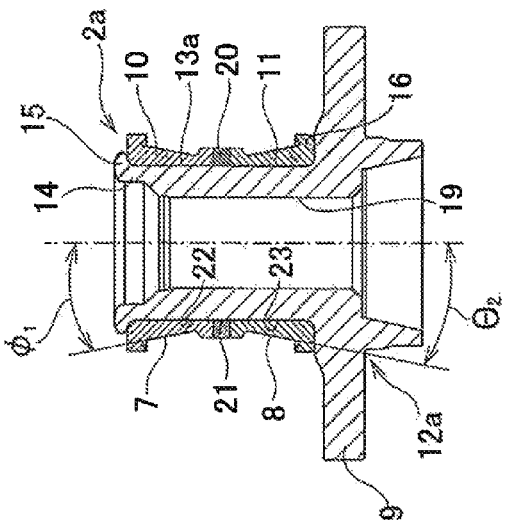
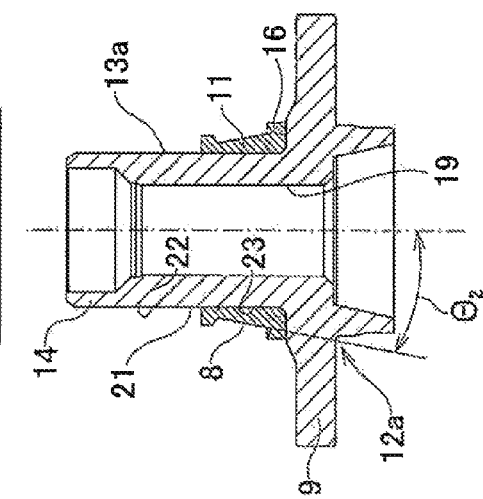
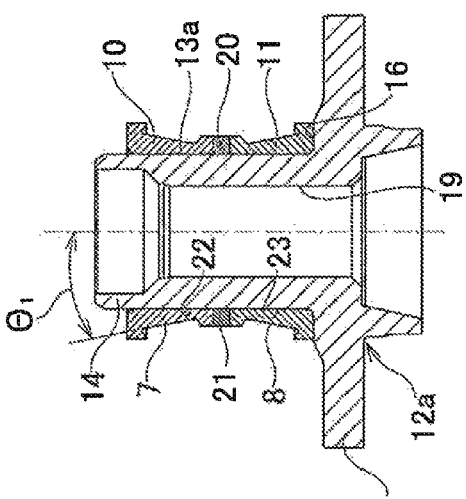
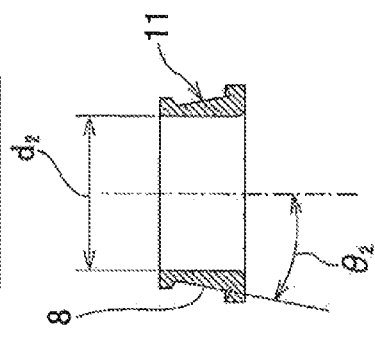
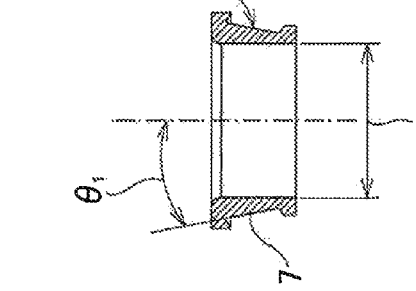

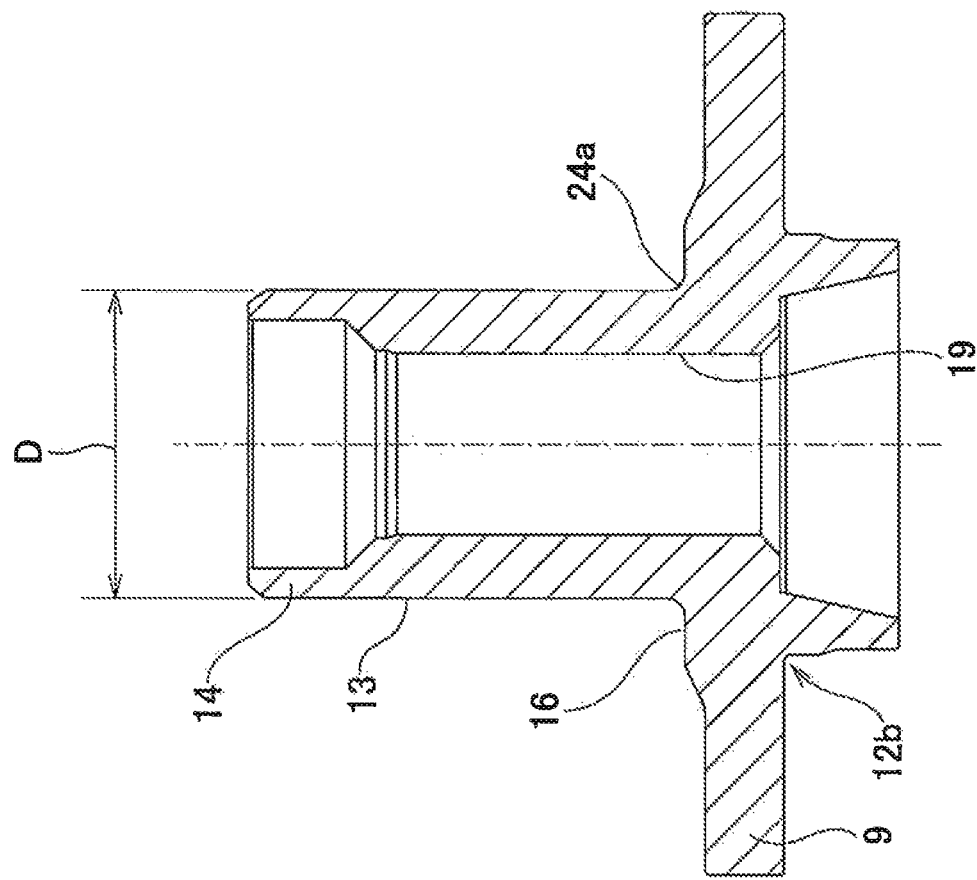
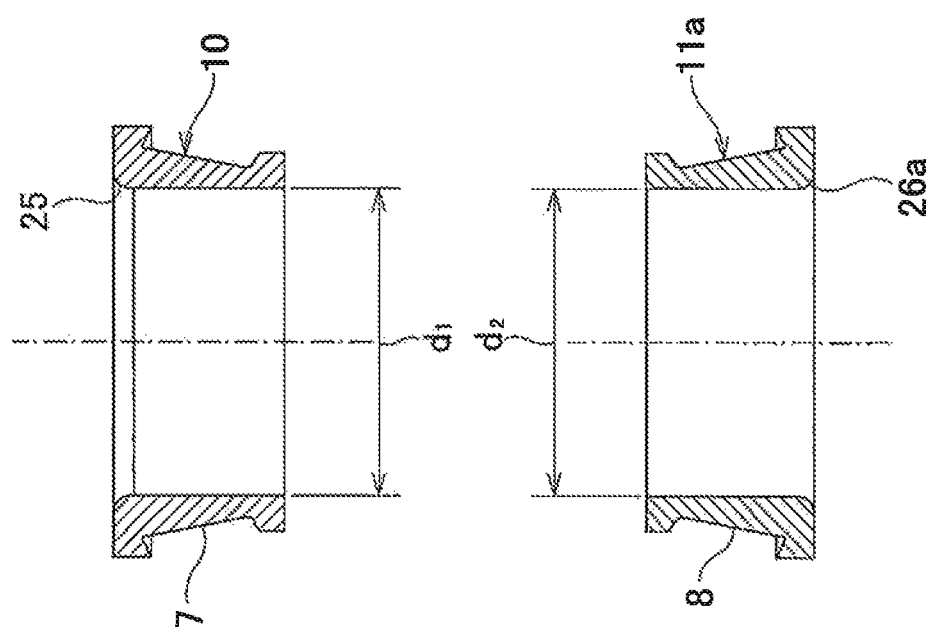

DOUBLE-ROW TAPERED ROLLER BEARING UNIT AND METHOD FOR MANUFACTURING SAME

TECHNICAL FIELD

The present invention relates to a double-row tapered-roller bearing unit that is used in comparatively heavy automobiles, such as large passenger vehicles, for rotatably supporting the wheels with respect to the suspension; and relates to the method for manufacturing that double-row tapered-roller bearing unit.

BACKGROUND ART

FIG. 9 illustrates a double-row tapered-roller bearing unit that is used in comparatively heavy automobiles such as small trucks or large passenger vehicles for rotatably supporting the wheels with respect to the suspension. This double-row tapered-roller bearing unit includes an outer ring 1 that is an outer-diameter-side bearing ring member, a hub 2 that is an inner-diameter-side bearing ring member, and plural tapered rollers 3.

The outer ring 1 includes double-row outer-ring raceways 4, 5 that are formed on the inner circumferential surface thereof, and a stationary-side flange 6 that is formed on the outer-circumferential surface thereof for joining and fastening the outer ring 1 to the knuckle of a suspension. Of the double-row outer-ring raceways 4, 5, the first outer-ring raceway 4 that is located on the inside in the axial direction, which is one side in the axial direction, and the second outer-ring raceway 5 that is located on the outside in the axial direction, which the other side in the axial direction, have partial conical surfaces that are inclined in directions so that the diameters become larger going in directions going away from each other in the axial direction. The "inside" in the axial direction is the center side in the width direction of the vehicle when assembled in an automobile, and is the right side in FIG. 1 and FIG. 9, and is the top side in FIG. 3 and FIG. 8. On the other hand, the "outside" in the axial direction is the outside in the width direction of the vehicle, and is the left side in FIG. 1 and FIG. 9, and is the bottom side in FIG. 3 and FIG. 8.

The hub 2 is concentrically arranged with the outer ring 1. The hub 2 includes double-row inner-ring raceways 7, 8 that are located on the inside-end section and the middle section in the axial direction of the outer-circumferential surface thereof, and a rotating-side flange 9 that is formed in the portion near the outside end in the axial direction that protrudes in the axial direction from the inner-diameter side of the outer ring 1 for supporting and fastening a wheel. Of the double-row inner-ring raceways 7, 8, the first inner-ring raceway 7 that is located on the inside in the axial direction and the second inner-ring raceway 8 that is located on the outside in the axial direction have partial conical surface that are inclined in directions so that the diameters become larger going in directions away from each other in the axial direction.

The hub 2 includes a circular ring-shaped first inner ring 10 with the first inner-ring raceway 7 formed on the outer-circumferential surface thereof, a circular ring-shaped second inner ring 11 with the second inner-ring raceway 8 formed on the outer-circumferential surface thereof, and a hub main body 12 that is a shaft member and that is integrally formed with the rotating-side flange 9. The first inner-ring raceway 7 and the second inner-ring raceway 8 are respectively provided between a small rim section that is provided on the small-diameter-side end section and a large rim section that is provided on the large-diameter-side end section of the outer-circumferential surface of each of the first inner ring 10 and the second inner ring 11. The second inner ring 11 is press-fitted with an interference fit onto the outside half section in the axial direction of a cylindrical-shaped fitting surface section 13 that is provided so as to extend from the inside end section to the middle section in the axial direction of the outer-circumferential surface of the hub main body 12. The first inner ring 10 is press-fitted with an interference fit onto the inside half section in the axial direction of the fitting surface section 13. The large-diameter-side end surface of the first inner ring 10 is held by a crimped section 15 that is formed by plastically deforming the cylindrical section 14 that is provided on the inside end section in the axial direction of the hub main body 12 outward in the radial direction. Therefore, the first inner ring 10 and the second inner ring 11 are held on both sides in the axial direction by a step side surface 16 that exists on the outside end section in the axial direction of the fitting surface section 13 and the crimped section 15, and in this state, are joined and fastened to the hub main body 12.

Plural tapered rollers 3 are located between the first outer-ring raceway 4 and first inner-ring raceway 7, and between the second outer-ring raceway 5 and the second inner-ring raceway 8, and are rotatably held by the cage 17. Combined seal rings 18 are assembled between the inner-circumferential surface of the inside end section in the axial direction of the outer ring 1 and the outer-circumferential surface of the large-diameter-side end section of the first inner ring 10, and between the inner-circumferential surface of the outside end section in the axial direction of the outer ring 1 and the outer-circumferential surface of the large-diameter-side end section of the second inner ring 11; and these seal rings 18 cover the openings on both ends in the axial direction of the cylindrical-shaped space where the tapered rollers 3 are located. A spline hole 19 is provided in the center section in the radial direction of the hub main body 12 for receiving the tip-end section of the drive shaft and forming a spline engagement with the drive shaft.

When assembling the hub 2, as the crimped section 15 is formed, the inner ring 10 is elastically deformed so that the large-diameter-side end section of the first inner ring 10 is elastically expanded radially more than the small-diameter-side end section, which changes the inclination angle of the first inner-ring raceway 7. Therefore, as disclosed in JP 4,019,548 (B2), taking the change in the inclination angle of the first inner-ring raceway 7 into consideration, it is necessary to adjust the inclination angle of the first inner-ring raceway 7 in the state before forming the crimped section 15. When this kind of adjustment is not performed, there is a possibility that the contact state between the rolling contact surfaces of the tapered rollers 3 and each of the raceways 4, 5, 7, 8 will become improper, and that maintaining the durability of the double-row tapered-roller bearing unit will become difficult. The inclination angle of the first inner-ring raceway 7 is the inclination angle of the first inner-ring raceway 7 with respect to the center axis of the first inner ring 10, and the inclination angle of the second inner-ring raceway 8 is the inclination angle of the second inner-ring raceway 8 with respect to the center axis of the second inner ring 11.

However, taking the change in the inclination angle of the first inner-ring raceway 7 into consideration, and adjusting only the inclination angle of the first inner-ring raceway 7 in the state before forming the crimped section 15, is not sufficient for placing the inclination angles of both the first inner-ring raceway 7 and the second inner-ring raceway 8 within the proper range, and particularly, is not sufficient for making these inclination angles the same after the hub 2 has been assembled. Therefore, from the aspect of improving the durability of a double-row tapered-roller bearing unit, there is still room for improvement.

RELATED LITERATURE

Patent Literature

[Patent Literature 1] JP 4,019,548 (B2)

SUMMARY OF INVENTION

Problem to be Solved by Invention

Taking the situation described above into consideration, the object of the present invention is to provide construction of a double-row tapered-roller bearing that is able to further improve the durability, and to provide a manufacturing method for achieving such a double-row tapered-roller bearing.

Means for Solving Problems

The double-row tapered-roller bearing unit of the present invention includes:

an outer-diameter-side raceway member having a first outer-ring raceway and a second outer-ring raceway formed on the inner-circumferential surface thereof, the first outer-ring raceway and the second outer-ring raceway having partial conical surfaces inclined in directions so that the diameters become larger going in directions away from each other in the axial direction;

an inner-diameter-side raceway member having a first inner-ring raceway and a second inner-ring raceway formed on the outer-circumferential surface thereof, the first inner-ring raceway and the second inner-ring raceway having partial conical surfaces inclined in directions so that the diameters become larger going in directions away from each other in the axial direction; and plural tapered rollers rotatably provided respectively between the first outer-ring raceway and the first inner-ring raceway, and between the second outer-ring raceway and the second inner-ring raceway; and the inner-diameter-side raceway member includes a first inner ring with the first inner-ring raceway formed on the outer-circumferential surface thereof, a second inner ring with the second inner-ring raceway formed on the outer-circumferential surface thereof, and a shaft member; the first inner ring and the second inner ring are press-fitted onto the shaft member; and the first inner ring and the second inner ring are connected and fastened to the shaft member by securing the large-diameter-side end surface of the first inner ring by a crimped section formed by elastically deforming one end section in the axial direction of the shaft member.

Particularly, in the case of the double-row tapered-roller bearing of the present invention the relationship of the inclination angle $\theta_1$ of the first inner-ring raceway in the state before the first inner ring is press-fitted onto the shaft member;

the inclination angle $\theta_2$ of the second inner-ring raceway in the state before the second inner ring is press-fitted onto the shaft member;

the amount of decrease $\delta\theta_a$ in the inclination angle of the first inner-ring raceway occurring when the first inner ring is press-fitted onto the shaft member;

the amount of decrease $\delta\theta_b$ in the inclination angle of the second inner-ring raceway occurring when the second inner ring is press-fitted onto the shaft member;

the amount of increase $\delta\theta_k$ in the inclination angle of the first inner-ring raceway occurring when the crimped section is formed;

the press-fit interference $\Delta X_1$ of the first inner ring with respect to the shaft member; and the press-fit interference $\Delta X_2$ of the second inner ring with respect to the shaft member;

satisfy the equation $$-\theta_1+\delta\theta_a(\Delta X_1)+\theta_2-\delta\theta_b(\Delta X_2)=\delta\theta_k$$

and the inclination angle $\phi_1$ of the first inner-ring raceway and the inclination angle $\Theta_2$ of the second inner-ring raceway in the state after the crimped section has been formed are both within respective proper ranges. Preferably, the inclination angle $\phi_1$ of the first inner-ring raceway and the inclination angle $\Theta_2$ of the second inner-ring raceway in the state after the crimped section has been formed are both within respective proper ranges and are essentially equal.

In one embodiment of the double-row tapered-roller bearing unit of the present invention, the inner-diameter dimension of the first inner ring in the state before the first inner ring is press-fitted onto the shaft member, and the inner-diameter dimension of the second inner ring in the state before the second inner ring is press-fitted onto the shaft member are essentially the same; and a stepped section is provided between the portion onto which the inner ring is press-fitted and the portion onto which the second inner ring is press-fitted of the outer-circumferential surface of the shaft member, and the outer-diameter dimension of the portion of the outer-circumferential surface of the shaft member onto which the first inner ring is press-fitted in the state before the first inner ring is press-fitted onto the shaft member is larger than the outer-diameter dimension of the portion of the outer-circumferential surface of the shaft member onto which the second inner ring is press-fitted in the state before the second inner ring is press-fitted onto the shaft member.

In this case, preferably a spacer is held on the stepped section between the small-diameter-side end surface of the first inner ring and the small-diameter-side end surface of the second inner ring. Moreover, preferably, the properties of the first inner ring and the second inner ring are essentially equivalent.

In another embodiment of the double-row tapered-roller bearing unit of the present invention, the portion of the outer-circumferential surface of the shaft member onto which the first inner ring is fitted and the portion of the outer-circumferential surface of the shaft member onto which the second inner ring is fitted define a continuous single cylindrical surface, and the inner-diameter dimension of the first inner ring in the state before the first inner ring is press-fitted onto the shaft member is smaller than the inner-diameter dimension of the second inner ring in the state before the second inner ring is press-fitted onto the shaft member.

In this embodiment, preferably the first inner ring has an R chamfer section in the continuous section between the inner-circumferential surface and the large-diameter-side end surface;

the second inner ring has an R chamfer section in the continuous section between the inner-circumferential surface and the large-diameter-side end surface that has a larger radius of curvature than that of the R chamfer section of the first inner ring, or has a C chamfer section that has a width dimension in the axial direction and width dimension in the radial direction that are larger than the radius of curvature of the R chamfer section of the first inner ring; and the shaft member has a rotating-side flange for supporting and fastening a wheel in a portion of the outer-circumferential surface that is adjacent to the other side in the axial direction of the portion onto which the second inner ring is press-fitted, and has a corner R section that is arc shaped in the cross section and that is located in the continuous section between the outer-circumferential surface of the shaft member and one side surface in the axial direction of the rotating-side flange in a position that faces the R chamfer section or C chamfer section of the second inner ring, and smoothly connects these surfaces.

The method for manufacturing a double-row tapered-roller bearing unit of the present invention is a method for manufacturing a double-row tapered-roller bearing unit having the construction described above, the method comprising a step of:

adjusting the inclination angle $\theta_1$ of the first inner-ring raceway in the state before the first inner ring is press-fitted onto the shaft member, the inclination angle $\theta_2$ of the second inner-ring raceway in the state before the second inner ring is press-fitted onto the shaft member, the amount of decrease $\delta\theta_a$ in the inclination angle of the first inner-ring raceway occurring when the first inner ring is press-fitted onto the shaft member, the amount of decrease $\delta\theta_b$ in the inclination angle of the second inner-ring raceway occurring when the second inner ring is press-fitted onto the shaft member, and the amount of increase $\delta\theta_k$ in the inclination angle of the first inner-ring raceway occurring when the crimped section is formed, so that the inclination angle $\phi_1$ of the first inner-ring raceway and the inclination angle $\Theta_2$ of the second inner-ring raceway in the state after the crimped section has been formed are both kept within respective proper ranges. Preferably, the adjustment is performed so that the inclination angle $\phi_1$ of the first inner-ring raceway and the inclination angle $\Theta_2$ of the second inner-ring raceway in the state after the crimped section has been formed are both kept within respective proper ranges, and are essentially the same.

In this case, preferably the adjustment is performed so that the inclination angle $\theta_1$ and the inclination angle $\theta_2$ are essentially equal, and so that the equation:

$$\delta\theta_a(\Delta X_1) - \delta\theta_b(\Delta X_2) = \delta\theta_k$$

is satisfied.

More specifically, the amount of decrease $\delta\theta_a$ in the inclination angle can be adjusted by adjusting the press-fit interference $\Delta X_1$ of the first inner ring with respect to the shaft member; and the amount of decrease $\delta\theta_b$ in the inclination angle can be adjusted by adjusting the press-fit interference $\Delta X_2$ of the second inner ring with respect to the shaft member.

In one embodiment of the method for manufacturing a double-row tapered-roller bearing unit of the present invention, the press-fit interferences $\Delta X_1$, $\Delta X_2$ are each adjusted by making the inner-diameter dimension of the first inner ring in the state before the first inner ring is press-fitted onto the shaft member, and the inner-diameter dimension of the second inner ring in the state before the second inner ring is press-fitted onto the shaft member essentially the same; and by providing a stepped section between the portion of the outer-circumferential surface of the shaft member onto which the first inner ring is press-fitted and the portion onto which the second inner ring is press-fitted, making the outer-diameter dimension of the portion of the outer-circumferential surface of the shaft member onto which the first inner ring is press-fitted in the state before the first inner ring is press-fitted onto the shaft member larger than the outer-diameter dimension of the portion of the outer-circumferential surface of the shaft member onto which the second inner ring is press-fitted in the state before the second inner ring is press-fitted onto the shaft member.

In this case, preferably a spacer is held on the stepped section between the small-diameter-side end surface of the first inner ring and the small-diameter-side end surface of the second inner ring. Moreover, preferably, the properties of the first inner ring and the second inner ring are made to be essentially equivalent.

On the other hand, in another embodiment of the method for manufacturing a double-row tapered-roller bearing unit of the present invention, the portion of the outer-circumferential surface of the shaft member onto which the first inner ring is fitted and the portion of the outer-circumferential surface of the shaft member onto which the second inner ring is fitted define a continuous single cylindrical surface, and the press-fit interferences $\Delta X_1$, $\Delta X_2$ are each adjusted by making the inner-diameter dimension of the first inner ring in the state before the first inner ring is press-fitted onto the shaft member smaller than the inner-diameter dimension of the second inner ring in the state before the second inner ring is press-fitted onto the shaft member.

In this case, preferably, an R chamfer section is provided in the continuous section between the inner-circumferential surface and the large-diameter-side end surface of the first inner ring;

an R chamfer section having a larger radius of curvature than that of the R chamfer section of the first inner ring, or a C chamfer section having a width dimension in the axial direction and width dimension in the radial direction that are larger than the radius of curvature of the R chamfer section of the first inner ring is provided in the continuous section between the inner-circumferential surface and the large-diameter-side end surface of the second inner ring; and a rotating-side flange for supporting and fastening a wheel is provided in a portion of the outer-circumferential surface of the shaft member that is adjacent to the other side in the axial direction of the portion onto which the second inner ring is press-fitted, and a corner R section that is arc shaped in the cross section is provided in the continuous section between the outer-circumferential surface of the shaft member and one side surface in the axial direction of the rotating-side flange in a position that faces the R chamfer section or C chamfer section of the second inner ring, and smoothly connects these surfaces.

Effect of Invention

With the method for manufacturing a double-row tapered-roller bearing unit of the present invention, the inclination angle $\phi_1$ of the first inner-ring raceway and the inclination angle $\Theta_2$ of the second inner ring-raceway in the state after the crimped section is formed are adjusted while taking into consideration not only the amount of increase $\delta\theta_k$ in the inclination angle of the first inner-ring raceway due to formation of the crimped section, but also the amount of decrease $\delta\theta_a$ in the inclination of the first inner-ring raceway and the amount of decrease $\delta\theta_b$ in the inclination of the second inner-ring raceway that occurs when the first inner ring and the second inner ring are press-fitted onto the shaft member, so it is possible to bring these inclination angles $\phi_1$, $\Theta_2$ sufficiently close to the center values (most ideal values) of the respective proper ranges. As a result, it is possible to further improve the durability of the double-row tapered-roller bearing unit.

BRIEF DESCRIPTION OF DRAWINGS

FIG. 3 is a view illustrating the order of processing steps of the assembly method for assembling the hub;

FIG. 8 is a cross-sectional view of a second example of an embodiment of the present invention, and illustrates the first inner ring, second inner ring and hub main body in the state before being combined.

MODES FOR CARRYING OUT INVENTION

First Example

Figure 1:
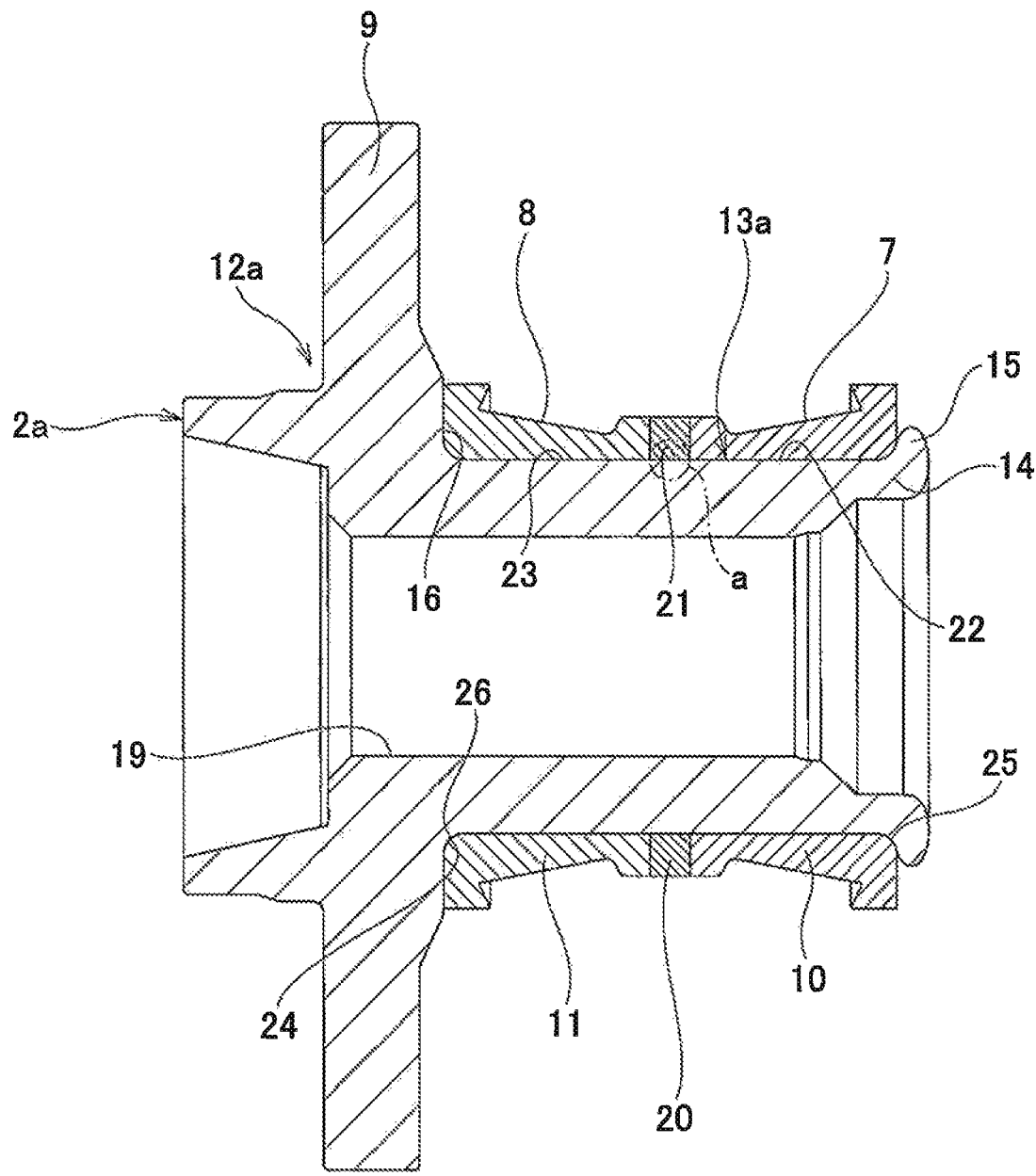
FIG. 1 is a cross-sectional view of a first example of an embodiment of the present invention, and illustrates a state in which part of the parts are omitted.
Figure 2:
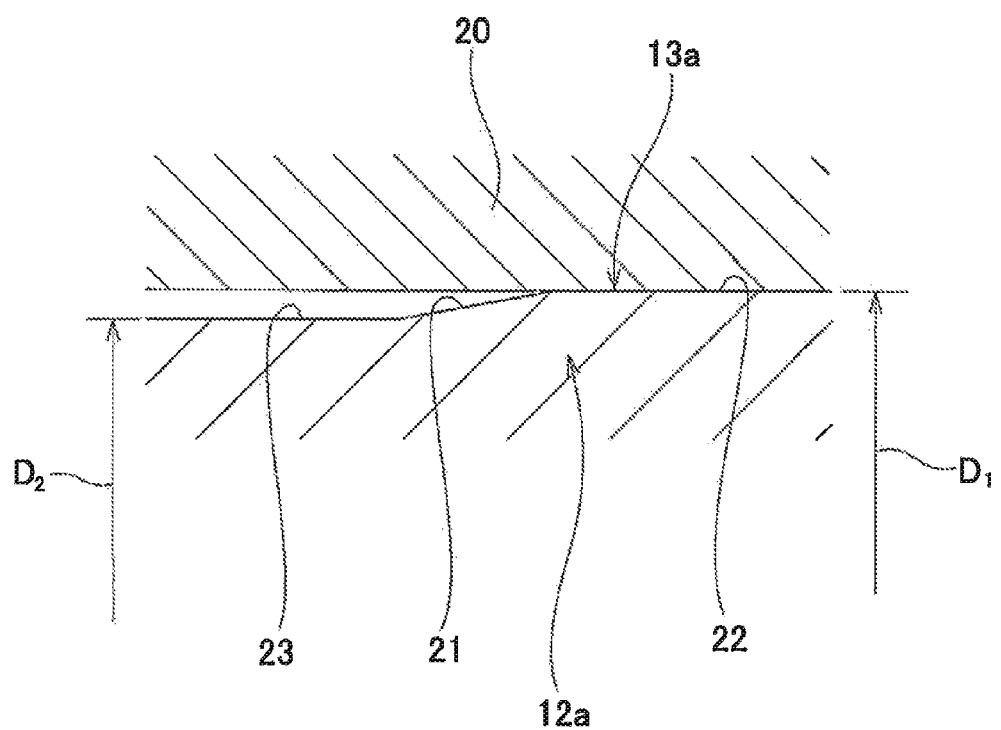
FIG. 2 is an enlarged view of area 'a' in FIG. 1.
Figure 4:
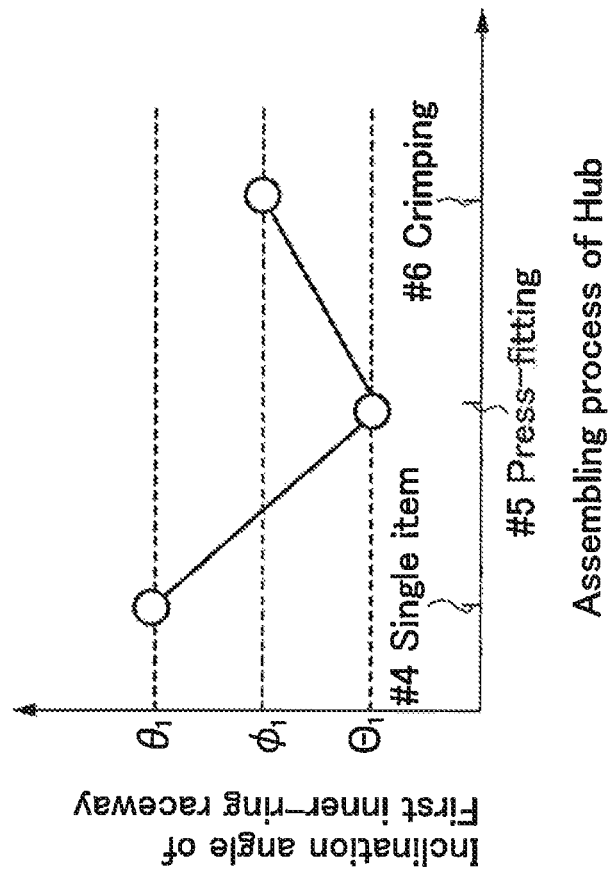
FIG. 4A is a graph illustrating change in the inclination angle of the first inner-ring raceway that occurs due to assembling of the hub.
FIG. 4B is a graph illustrating the change in the inclination angle of the second inner-ring raceway that occurs due to assembling of the hub.
Figure 4:
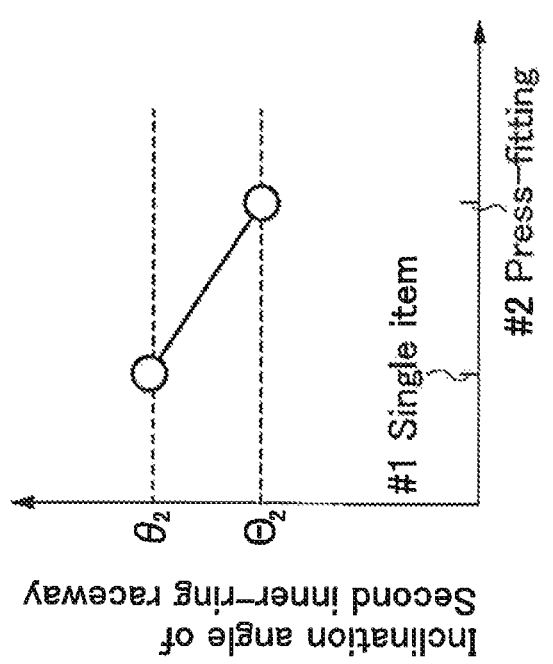
Figure 9:
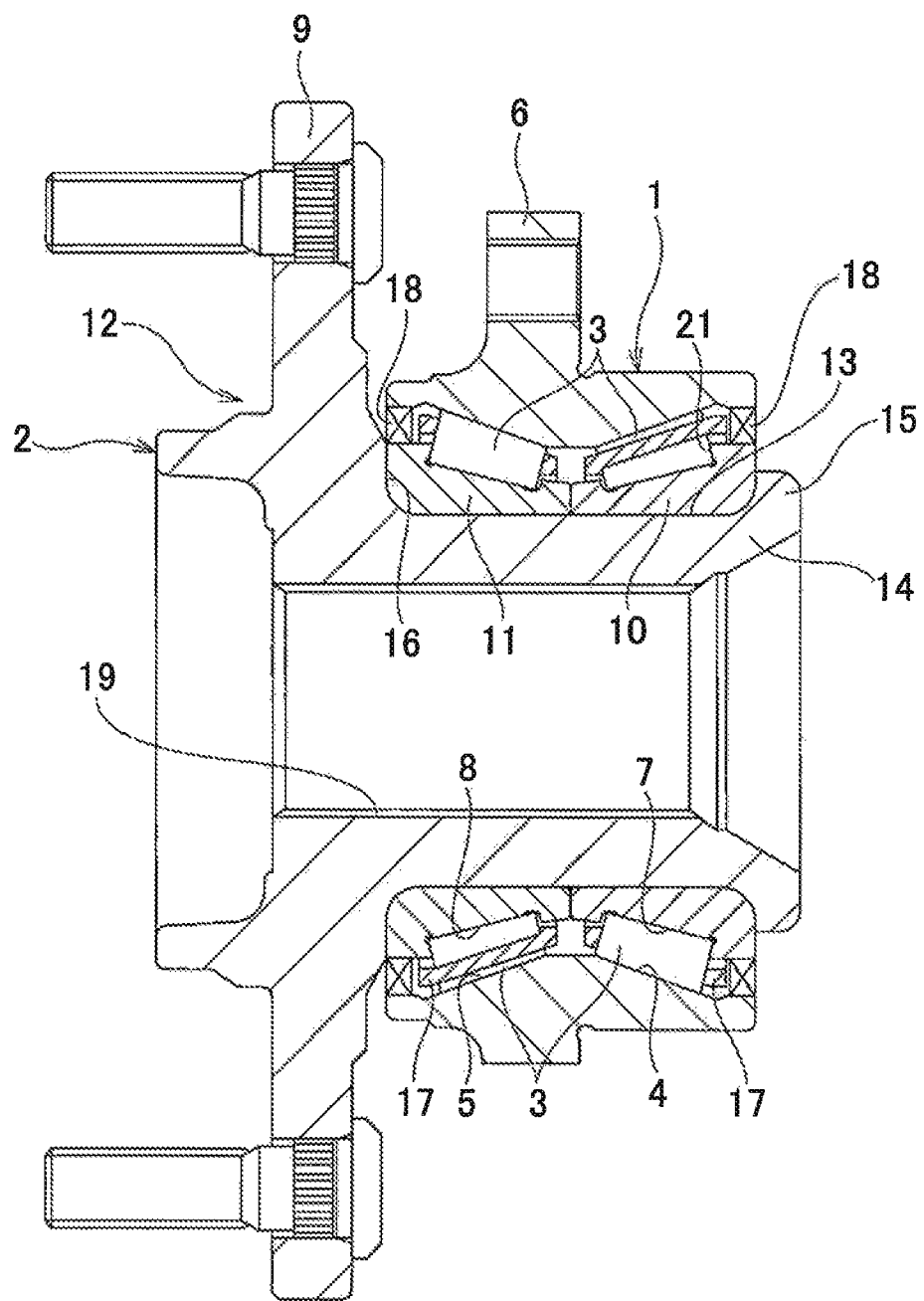
FIG. 9 is a cross-sectional view illustrating an example of a conventional double-row tapered-roller bearing for supporting a wheel.

FIG. 1 to FIG. 7 illustrate a first example of an embodiment of the present invention. A feature of this example is mainly the adjustment of the dimensions of each of the parts so that the inclination angles of the first inner-ring raceway 7 and second inner-ring raceway 8 are within a proper range when the hub 2a is in the assembled state. The double-row tapered-roller bearing unit for wheel support that is the object of this example is similar to the conventional construction illustrated in FIG. 9 and includes an outer ring 1, a hub 2a and plural tapered rollers 3. FIG. 1 illustrates the double-row tapered-roller bearing unit for wheel support of this example with part of the parts such as the outer ring 1, the plural tapered rollers 3, a pair of retainers 17 and a pair of combination seal rings 18 omitted.

The outer ring 1 includes double-row outer-ring raceways 4, 5 that are formed on the inner-circumferential surface thereof, and a stationary-side flange 6 that is formed on the outer-circumferential surface and is for joining and fastening the outer ring 1 to the knuckle of a suspension. Of the double-row outer-ring raceways 4, 5, a first outer-ring raceway 4 that is located on the inside in the axial direction, and a second outer-ring raceway 5 that is located on the outside in the axial direction have partial conical surfaces that are inclined in directions such that the diameters become larger going in directions away from each other in the axial direction.

The hub 2a is arranged on the inner-diameter side of the outer ring 1 so as to be concentric with the outer ring 1. The hub 2a includes double-row inner-ring raceways 7, 8 that are formed on the inside-end section and middle section in the axial direction of the outer-circumferential surface thereof, and a rotating-side flange 9 that is formed on the portion near the outside end in the axial direction that protrudes in the axial direction from the inner-diameter side of the outer ring 1, and is for supporting and fastening a wheel. Of the double-row inner-ring raceways 7, 8, a first inner-ring raceway 7 that is located on the inside in the axial direction, and a second inner-ring raceway 8 that is located on the outside in the axial direction have partial conical surfaces that are inclined in directions such that the diameters become larger going in directions away from each other in the axial direction.

The hub 2a includes: a circular ring-shaped first inner ring 10 with the first inner-ring raceway 7 formed on the outer-circumferential surface thereof, a circular ring-shaped second inner ring 11 with the second inner-ring raceway 8 formed on the outer-circumferential surface thereof, a circular ring-shaped spacer 20 that is used for preload adjustment, and a hub main body 12a that is integrally formed with the rotating-side flange 9. The first inner-ring raceway 7 and the second inner-ring raceway 8 are respectively provided in a portion between a small-rim section that is provided on the small-diameter-side end section and a large-rim section that is provided on the large-diameter-side end section on the outer-circumferential surface of each of the first inner ring 10 and the second inner ring 11. The second inner ring 11 is press-fitted with an interference fit on the outside half section in the axial direction of a cylindrical-shaped fitting-surface section 13a that spans from the inside end section to the middle section in the axial direction of the outer-circumferential surface of the hub main body 12a. The first inner ring 10 is press-fitted with an interference fit on the inside half section in the axial direction of the fitting-surface section 13a. The spacer 20 is held between the small-diameter-side end surface of the first inner ring 10 and the small-diameter-side end surface of the second inner ring 11. The large-diameter-side end surface of the first inner ring 10 is secured by a crimped section 15 that is formed by plastically deforming a cylindrical section 14 that is provided on the inside-end section in the axial direction of the hub main body 12a outward in the radial direction. Therefore, the first inner ring 10 and second inner ring 11, and the spacer 20 are held on both sides in the axial direction by a step side surface 16 that exists on the outside-end section in the axial direction of the fitting-surface section 13a and the crimped section 15, and joined and fastened to the hub main body 12a.

Plural tapered rollers 3 are provided respectively between the first outer-ring raceway 4 and first inner-ring raceway 7 and between the second outer-ring raceway 5 and second inner-ring 8, and rotatably held by a cage 17. Combined seal rings 18 are attached between the inner-circumferential surface of the inside end section in the axial direction of the outer ring 1 and the outer-circumferential surface of the large-diameter-side end section of the first inner ring 10, and between the inner-circumferential surface of the outside end section in the axial direction of the outer ring 1 and the outer-circumferential surface of the large-diameter-side end section of the second inner ring 11, and these seal rings 18 cover the openings on both ends in the axial direction of the cylindrical space where the tapered rollers 3 are located. A spline hole 19 is provided in the center section in the radial direction of the hub main body 12 for receiving the tip-end section of the drive shaft inserted therein and forming a spline engagement with the drive shaft.

FIG. 3A to FIG. 3F illustrate the order for processing steps of the assembly method for assembling the hub 2a of the rolling bearing unit for wheel support of this example. In order to assemble the hub 2a, first, the second inner ring 11 illustrated in FIG. 3A is press-fitted onto the outside end section in the axial direction of the fitting-surface section 13a of the hub main body 12a from the inside in the axial direction as illustrated in FIG. 3B. Next, as illustrated in FIG. 3C, the spacer 20 is fitted with a loose fit on a stepped section 21 that is provided on a portion in the middle section in the axial direction of the fitting-surface section 13a that is adjacent to the second inner ring 11 on the inside in the axial direction. Next, as illustrated in FIG. 3E, the first inner ring 10 illustrated in FIG. 3D is press-fitted from the inside in the axial direction with an interference fit onto the portion of the fitting-surface section 13a that is near the inside end in the axial direction that is adjacent to the spacer 20 on the inside in the axial direction. Then, as illustrated in FIG. 13F a crimped section 15 is formed by plastically deforming the portion of a cylindrical section 14 that is provided on the inside-end section in the axial direction of the hub main body 12a that protrudes further toward the inside in the axial direction than the first inner ring 10 toward the outer radial side, and the large-diameter-side end surface (inside-end surface in the axial direction) of the first inner ring 10 is secured by the crimped section 15.

The following premises 1 and 2 are made for the double-row tapered-roller bearing unit for wheel support of this example.

<Premise 1>

Figure 5:
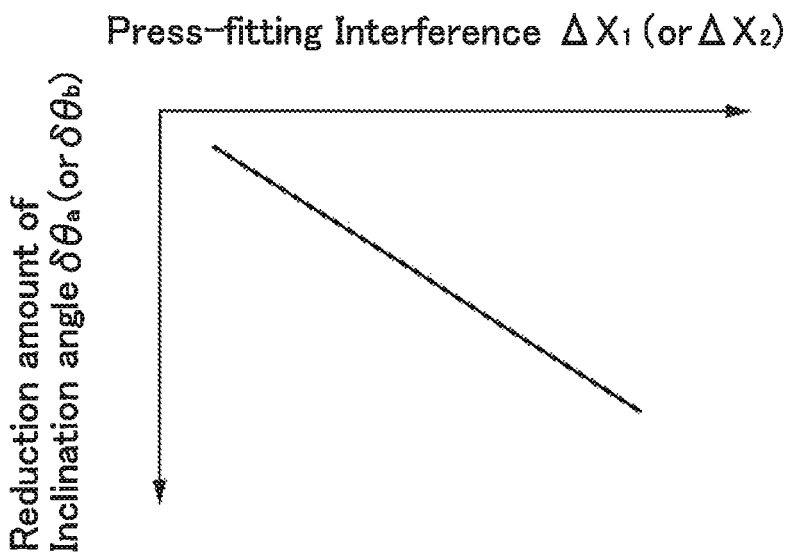
FIG. 5 is a graph illustrating the relationship between the press-fit interference for the first inner ring and second inner ring and the amount of decrease in the inclination angle of the first inner-ring raceway and the second inner-ring raceway.

The first inner ring 10 and second inner ring 11 are elastically deformed in a direction expanding the diameter by press-fitting the first inner ring 10 and second inner ring 11 onto the fitting-surface section 13a. More specifically, the thickness of the small-diameter side is thinner than the thickness of the large-diameter side, so the small-diameter side elastically deforms expanding the diameter comparatively more than the large-diameter side. Due to this elastic deformation, the inclination angles of the first inner-ring raceway 7 and the second inner-ring raceway 8 are decreased. In other words, the relationship between the inclination angle $\theta_1$ of the first inner-ring raceway 7 in the state (free state) before the first inner ring 10 is press-fitted onto the fitting-surface section 13a, and the inclination angle $\Theta_1$ of the first inner-ring raceway 7 after the first inner ring 10 has been press-fitted onto the fitting-surface section 13a becomes $\theta_1 > \Theta_1$ as illustrated in the left half section of FIG. 4B. The relationship between the inclination angle $\theta_2$ of the second inner-ring raceway 8 in the state (free state) before the second inner ring 11 is press-fitted onto the fitting-surface section 13a, and the inclination angle $\Theta_2$ of the second inner-ring raceway 8 after the second inner ring 11 has been press-fitted onto the fitting-surface section 13a becomes $\theta_2 > \Theta_2$ as illustrated in FIG. 4A. The relationship between the amount of decrease in the inclination angle of the first inner-ring raceway 7 (or the second inner-ring raceway 8) that occurs as the first inner ring 10 (or second inner ring 11) is press-fitted onto the fitting-surface section 13a (absolute value) $\delta\theta_a = \theta_1 - \Theta_1$ (or $\delta\theta_b = \theta_2 - \Theta_2$), and the press-fit interference $\Delta X_1$ (or $\Delta X_2$) for the first inner ring 10 (or second inner ring 11) with respect to the fitting-surface section 13a is found in detail by testing or elastic FEM analysis, and is nearly a straight line (proportional relationship) as illustrated in FIG. 5.

<Premise 2>

As the large-diameter-side end section of the first inner ring 10 elastically deforms in a direction expanding the diameter due to the formation of the crimped section 15, the inclination angle of the first inner-ring raceway 7 increases. In other words, the relationship between the inclination angle $\Theta_1$ of the first inner-ring raceway 7 in the state before forming the crimped section 15, and the inclination angle $\phi_1$ of the first inner-ring raceway 7 after the crimped section 15 is formed becomes $\Theta_1 < \phi_1$ as illustrated in the right half section of FIG. 4B. In regard to premise 2, the amount of increase in the inclination angle of the first inner-ring raceway 7 that occurs as the crimped section 15 is formed (absolute value) $\delta\theta_k (= \phi_1 - \Theta_1)$ can be found in detail by testing and elasto-plastic FEM analysis.

In this example, taking Premises 1 and 2 into consideration, with the hub 2a in the assembled state, or in other words, in a state in which the crimped section 15 is formed, the inclination angle $\phi_1$ of the first inner-ring raceway 7, and the inclination angle $\Theta_2$ of the second inner-ring raceway 8 are made to be the same as each other within proper ranges ($\phi_1 = \Theta_2$, with high precision).

First, according to Premise 1, the following Equation (1) and Equation (2) are established. Here, the amount of decrease $\delta\theta_a$ (or $\delta\theta_b$) in the inclination angle of the first inner-ring raceway 7 (or second inner-ring raceway 8) when the press-fit interference $\Delta X_1$ (or $\Delta X_2$) for the first inner ring 10 (or second inner ring 11) with respect to the fitting-surface section 13a is expressed as $\delta\theta_a \Delta X_1$ (or $\delta\theta_b \Delta X_2$).

$$\Theta_1 = \theta_1 - \delta\theta_a(\Delta X_1) \tag{1}$$

$$\Theta_2 = \theta_2 - \delta\theta_b(\Delta X_2) \tag{2}$$

Next, according to Premise 2 described above, the following Equation 3 is established.

$$\phi_1 = \Theta_1 + \delta\theta_k = \theta_1 - \delta\theta_a(\Delta X_1) + \delta\theta_k \tag{3}$$

When the crimped section 15 is formed, the inclination $\Theta_2$ of the second inner-ring raceway 8 does not change.

In order to put the inclination angle $\phi_1$ of the first inner-ring raceway 7, and the inclination angle $\Theta_2$ of the second inner-ring raceway 8 within the same proper range when the hub 2a is assembled ($\phi_1 = \Theta_2$, with high precision), Equation (2) should be made to equal Equation (3), or in other words, the relationship of the following Equation (4) should be satisfied.

$$-\theta_1 + \delta\theta_a(\Delta X_1) + \theta_2 - \delta\theta_b(\Delta X_2) = \delta\theta_k \tag{4}$$

Particularly, in the case when $\theta_1 = \theta_2$, the relationship is made to satisfy the following Equation (5).

$$\delta\theta_a(\Delta X_1) - \delta\theta_b(\Delta X_2) = \delta\theta_k \tag{5}$$

A maximum value and a minimum value must be set for the press-fit interferences $\Delta X_1$, $\Delta X_2$. In other words, when the press-fit interferences $\Delta X_1$, $\Delta X_2$ are too large, the hoop stress (stress in the circumferential direction) that acts on the first inner ring 10 and second inner ring 11 by press-fitting the first inner ring 10 and the second inner ring 11 onto the fitting-surface section 13a becomes excessive. As a result, it becomes easy for cracking to occur in the first inner ring 10 and the second inner ring 11, and leads to a decrease in the life of the first inner-ring raceway 7 and the second inner-ring raceway 8. Therefore, in order that such problems do not occur, it is necessary to set a minimum value $\Delta m$ for the press-fit interferences $\Delta X_1$, $\Delta X_2$. In other words, the press-fit interferences $\Delta X_1$, $\Delta X_2$ must be within the range of the following Equation (6).

$$\Delta m \leq (\Delta X_1, \Delta X_2) \leq \Delta M \tag{6}$$

Figure 6:
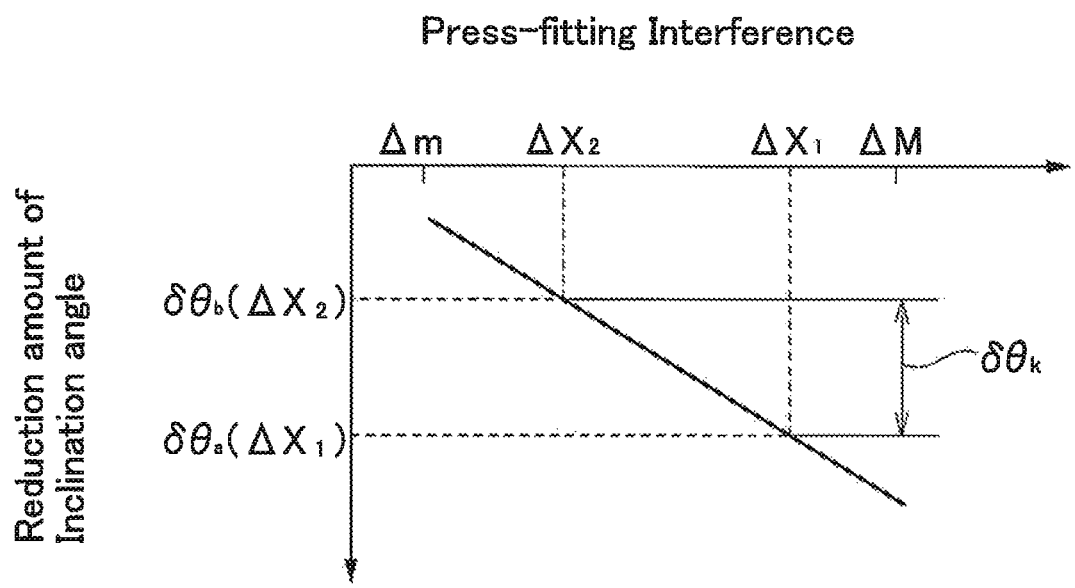
FIG. 6 is a graph illustrating the relationship between the press-fit interference for the first inner ring and second inner ring, the amount of decrease in the inclination angle of the first inner-ring raceway and the second inner-ring raceway, and the amount of increase in the inclination angle of the first inner-ring raceway.
Figure 7:
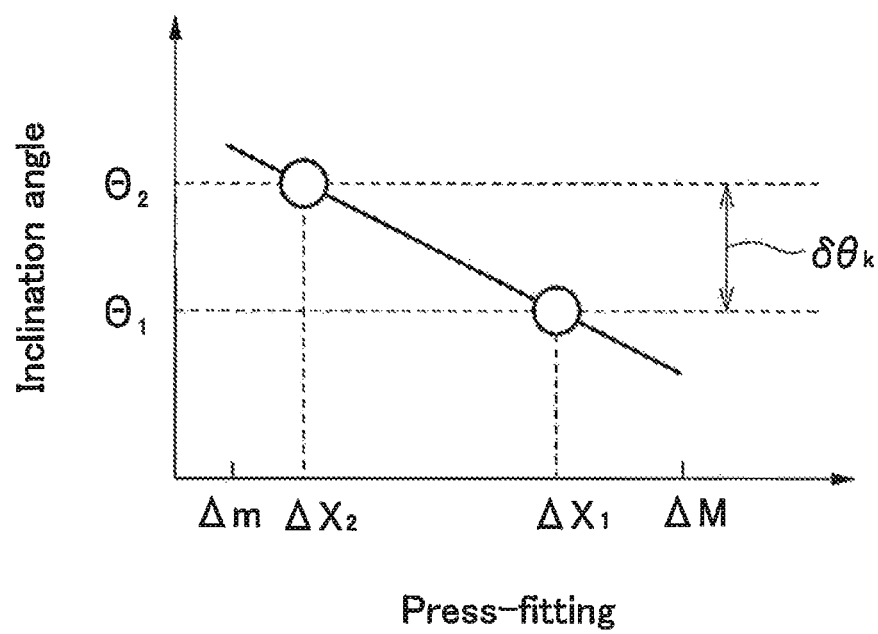
FIG. 7 is a graph illustrating the relationship between the press-fit interference for the first inner ring and second inner ring, the inclination angles of the first inner-ring raceway and second inner-ring raceway after press-fitting, and the amount of increase in the inclination angle of the first inner-ring raceway.

To summarize the explanation above, as illustrated in FIG. 6 and FIG. 7, by performing design so that the relationship of Equation 5 (when $\theta_1 = \theta_2$) or Equation (4) (when $\theta_1 \neq \theta_2$) are satisfied within the range of Equation (6), the problems described above do not occur, and in the assembled state of the hub 2a, it is possible to put the inclination angle $\phi_1$ of the first inner-ring raceway 7 and the inclination angle $\Theta_2$ of the second inner-ring raceway 8 within the same proper range ($\phi_1 = \Theta_2$, with high precision).

Therefore, in this example, a first inner ring 10 and second inner ring 11, for which the properties such as the materials and the geometric properties including the shape and dimensions in the state (free state) before the first inner ring 10 and second inner ring 11 are press-fitted onto the fitting-surface section 13a are essentially equivalent except for unavoidable manufacturing errors, are used as the first inner ring 10 and second inner ring 11. In other words, in the state before the first inner ring 10 and the second inner ring 11 are press-fitted onto the fitting-surface section 13a, the inner-diameter dimension $d_1$ of the first inner ring 10 and the inner-diameter dimension $d_2$ of the second inner ring 11 are essentially equivalent ($d_1 = d_2$), and the inclination angle $\theta_1$ of the first inner-ring raceway 7 and the inclination angle $\theta_2$ of the second inner-ring raceway 8 are essentially equivalent ($\theta_1 = \theta_2$).

Moreover, in order to satisfy the relationship of Equation (5), a stepped section 21 having a partial conical surface (tapered surface) is provided in the portion of the fitting-surface section 13a that is positioned between the portion onto which the first inner ring 10 is fitted and the portion onto which the second inner ring 11 is fitted, which is the portion where the inner-diameter side of the spacer 20 is located. As a result, of the fitting-surface section 13a, the inside section in the axial direction onto which the first inner ring 10 is fitted defines a large-diameter section 22 having an outer-diameter dimension of $D_1$ before the first inner ring 10 is press-fitted, and the outside section in the axial direction onto which the second inner ring 11 is fitted defines a small-diameter section 23 having an outer-diameter dimension of $D_2$ ($< D_1$) before the second inner ring 11 is press-fitted. Due to providing a difference in diameters between the large-diameter section 22 and the small-diameter section 23 ($D_2 < D_1$), the press-fit interference $\Delta X_1 = D_1 - d_1$ of the first inner ring 10 is larger than the press-fit interference $\Delta X_2 = D_2 - d_2$ of the second inner ring 11 within the range of Equation (6) ($\Delta X_1 > \Delta X_2$). As a result, the amount of decrease in the inclination angle $\delta\theta_a(\Delta X_1)$ is taken to be larger than the amount of decrease in the inclination angle $\delta\theta_b(\Delta X_2)$, and by making the difference $\delta\theta_a(\Delta X_1) - \delta\theta_b(\Delta X_2)$ between the amounts of decrease in the inclination angles $\delta\theta_a(\Delta X_1)$, $\delta\theta_b(\Delta X_2)$ essentially equivalent to the amount of increase in the inclination angle $\delta\theta_k$, the relationship of Equation (5) is satisfied.

As described above, in the case of the double-row tapered-roller bearing unit and manufacturing method of this example, not only the amount of increase $\delta\theta_k$ in the inclination angle of the first inner ring 11 during the formation of the crimped section 15, but also the amount of decrease $\delta\theta_a(\Delta X_1)$ in the inclination angle of the first inner-ring raceway 7 and the amount of decrease $\delta\theta_b(\Delta X_2)$ in the inclination angle of the second inner-ring raceway 8 due to press-fitting of the first inner ring 10 and second inner ring 11 onto the fitting-surface section 13a are taken into consideration, when adjusting the inclination angle $\phi_1$ of the first inner-ring raceway 7 and the inclination angle $\Theta_2$ of the second inner-ring raceway 8 in the state after the crimped section 15 has been formed. Therefore, it is possible to make these inclination angles $\phi_1$, $\Theta_2$ sufficiently close to the center value (most ideal value) in the same proper range ($\phi_1 = \Theta_2$, with high precision). As a result, it is possible to improve the contact state between the first inner-ring raceway 7 and second inner-ring raceway 8, and first outer-ring raceway 4 and second outer-ring raceway 5 and the rolling contact surfaces of the plural tapered rollers 3. Therefore, it is possible to further improve the durability of the double-row tapered-roller bearing unit for wheel support.

Moreover, in this example, a first inner ring 10 and second inner ring 11 having essentially the same properties such as material, shape, dimensions and the like are used. Therefore, it is possible to use the same apparatus for performing finish grinding of the first inner-ring raceway 7 and second inner-ring raceway 8, so it is easy to maintain product quality and productivity and to lower the cost. Furthermore, a spacer 20 is held between the small-diameter-side end surface of the first inner ring 10 and the small-diameter-side end surface of the second inner ring 11, and a stepped section 21 is provided in the portion of the fitting-surface section 13a where the inner-diameter side of the spacer 20 is located. Therefore, the first inner ring 10 or second inner ring 11 are prevented from being fitted on the outside of the stepped section 21, so it is possible prevent adverse effects caused by variation in the press-fit interference $\Delta X_1$ or $\Delta X_2$.

The present invention can also be applied to a double-row tapered-roller bearing unit for wheel support that is for a follower wheel, or to a double-row tapered-roller bearing unit for other than wheel support. Moreover, the present invention can also be applied to a double-row tapered-roller bearing of which the outer-diameter-side raceway member rotates and the inner-diameter-side raceway member does not rotate in the operating state.

Furthermore, when embodying the present invention, it is not absolutely necessary that a spacer be held between the small-diameter-side end surface of the first inner ring and the small-diameter-side end surface of the second inner ring. Moreover, when embodying the present invention, the inclination angle θ1 of the first inner-ring raceway and the inclination angle θ2 of the second inner-ring raceway in the state (free state) before press-fitting the first inner ring and second inner ring onto a shaft member can be different from each other, and the proper range for the inclination angle $\phi_1$ of the first inner-ring raceway and the proper range for the inclination angle $\Theta_2$ of the second inner-ring raceway in the state after the crimped section has been formed can be different from each other.

Second Example

FIG. 8 illustrates a second example of an embodiment of the present invention. In this example, in order to improve the strength of the base section of the rotating-side flange 9 of the hub main body 12b, the radius of curvature of the corner R section 24a that exists in the continuous section between the inside end section in the radial direction of the inside surface of the rotating-side flange 9 (step side surface 16) and the fitting-surface section 13 is made larger than the radius of curvature of the corner R section 24 of the hub main body 12a of the first example of an embodiment. Together with this, the radius of curvature of an R chamfer (round chamfer or radius chamfer) section 26a that exists in the continuous section between the inner-circumferential surface and the large-diameter-side end surface of the second inner ring 11a is also made larger than the radius of curvature of the R chamfer section 26 of the second inner ring 11 in the first example of an embodiment. As a result, the R chamfer section 26a is prevented from interfering with the corner R section 24a, and the large-diameter-side end surface of the second inner ring 11a is prevented from losing contact with the step side surface 16. Therefore, in this example, the radius of curvature of the R chamfer section 26a of the second inner ring 11a is larger than the radius of curvature of the R chamfer section 25 that exists in the continuous section between the inner-circumferential surface and the large-diameter-side end surface of the first inner ring 10. In other words, from the aspect of at least this point, the first inner ring 10 and the second inner ring 11a are different from each other in properties.

In this example, in order to satisfy the relationship of Equation (5), the portion of the fitting-surface section 13 onto which the first inner ring 10 is fitted and the portion onto which the second inner ring 11 is fitted define a continuous single cylindrical surface (outer diameter dimension D in the free state), and the inner-diameter dimension $d_1$ in the state before press-fitting the first inner ring 10 onto the fitting-surface section 13 with an interference fit, is less than the inner-diameter dimension $d_2$ in the state before press-fitting the second inner ring 11a onto the fitting-surface section 13 with an interference fit ($d_1 < d_2$), and due to this, the press-fit interference $\Delta X_1 = D - d_1$ of the first inner ring 10 is larger than the press-fit interference $\Delta X_2 = D - d_2$ of the second inner ring 11a ($\Delta X_1 > \Delta X_2$) in the range of Equation (6). As a result, the amount of decrease $\delta\theta_a(\Delta X_1)$ in the inclination angle of the first inner-ring raceway 7 is taken to be larger than the amount of decrease $\delta\theta_b(\Delta X_2)$ in the inclination angle of the second inner-ring raceway 8 ($\delta\theta_a(\Delta X_1) > \delta\theta_b(\Delta X_2)$), and by making the difference $\delta\theta_a(\Delta X_1) - \delta\theta_b(\Delta X_2)$ between these amounts of decrease in inclination angles $\delta\theta_a(\Delta X_1)$, $\delta\theta_b(\Delta X_2)$ essential equal to the amount of increase in the inclination angle $\delta\theta_k$, the relationship of Equation (5) is satisfied.

In the case of the double-row tapered-roller bearing unit and manufacturing method thereof of this example, the fitting-surface section 13 is a single cylindrical surface, and there is no stepped section provided that becomes the source of concentrated stress in the middle section in the axial direction of the fitting-surface section 13, so when compared with the case in the first example of an embodiment, it becomes easier to perform design for maintaining the strength of the hub main body 12b, and it becomes easier to maintain productivity of the hub main body 12b and to lower cost. The other construction and functions are the same as those of the first example of an embodiment.

In this example, it is also possible to change the R chamfer section 26a of the second inner ring 11a to a C chamfer (or 45 degree chamfer) section. In that case, by making the width dimension in the axial direction and the width dimension in the radial direction of the C chamfer section larger than the radius of curvature of the R chamfer section 25 of the first inner ring 10 (the radius of curvature of the R chamfer section 26 of the second inner ring 11 of the first example of an embodiment), it is possible to make the radius of curvature of the corner R section 24a that exists in the base portion of the rotating-side flange 9 large, and thus it is possible to improve the strength of this base portion.

EXPLANATION OF REFERENCE NUMBERS

1 Outer ring
2, 2a Hub
3 Tapered roller
4 First outer-ring raceway
5 Second outer-ring raceway
6 Stationary-side flange
7 First inner-ring raceway
8 Second inner-ring raceway
9 Rotating-side flange
10 First inner ring
11, 11a Second inner ring
12, 12a, 12b Hub main body
13, 13a Fitting-surface section
14 Cylindrical section
15 Crimped section
16 Step side surface
17 Cage
18 Combined seal ring
19 Spline hole
20 Spacer
21 Stepped section
22 Large-diameter section
23 Small-diameter section
24, 24a Corner R section
25 R chamfer section
26, 26a R chamfer section

What is claimed is:

1. A double-row tapered-roller bearing unit, comprising:
an outer-diameter-side raceway member having a first outer-ring raceway and a second outer-ring raceway formed on the inner-circumferential surface thereof, the first outer-ring raceway and the second outer-ring raceway having partial conical surfaces inclined in directions so that the diameters become larger going in directions away from each other in the axial direction;
an inner-diameter-side raceway member having a first inner-ring raceway and a second inner-ring raceway formed on the outer-circumferential surface thereof, the first inner-ring raceway and the second inner-ring raceway having partial conical surfaces inclined in directions so that the diameters become larger going in directions away from each other in the axial direction; and
plural tapered rollers rotatably provided respectively between the first outer-ring raceway and the first inner-ring raceway, and between the second outer-ring raceway and the second inner-ring raceway; and
the inner-diameter-side raceway member comprising a first inner ring with the first inner-ring raceway formed on the outer-circumferential surface thereof, a second inner ring with the second inner-ring raceway formed on the outer-circumferential surface thereof, and a shaft member; the first inner ring and the second inner ring press-fitted onto the shaft member; and the first inner ring and the second inner ring connected and fastened to the shaft member by securing the large-diameter-side end surface of the first inner ring by a crimped section formed by elastically deforming one end section in the axial direction of the shaft member, and the relationship of the inclination angle $\theta_1$ of the first inner-ring raceway in the state before the first inner ring is press-fitted onto the shaft member;

the inclination angle $\theta_2$ of the second inner-ring raceway in the state before the second inner ring is press-fitted onto the shaft member;

the amount of decrease $\delta\theta_a$ in the inclination angle of the first inner-ring raceway occurring when the first inner ring is press-fitted onto the shaft member;

the amount of decrease $\delta\theta_b$ in the inclination angle of the second inner-ring raceway occurring when the second inner ring is press-fitted onto the shaft member;

the amount of increase $\delta\theta_k$ in the inclination angle of the first inner-ring raceway occurring when the crimped section is formed;

the press-fit interference $\Delta X_1$ of the first inner ring with respect to the shaft member; and the press-fit interference $\Delta X_2$ of the second inner ring with respect to the shaft member;

satisfying the equation $$-\theta_1+\delta\theta_a(\Delta X_1)+\theta_2-\delta\theta_b(\Delta X_2)=\delta\theta_k$$

and the inclination angle $\phi_1$ of the first inner-ring raceway and the inclination angle $\Theta_2$ of the second inner-ring raceway in the state after the crimped section has been formed being both within respective proper ranges.

2. The double-row tapered-roller bearing unit according to claim 1, wherein the inner-diameter dimension of the first inner ring in the state before the first inner ring is press-fitted onto the shaft member, and the inner-diameter dimension of the second inner ring in the state before the second inner ring is press-fitted onto the shaft member are essentially the same; and a stepped section is provided between the portion onto which the inner ring is press-fitted and the portion onto which the second inner ring is press-fitted of the outer-circumferential surface of the shaft member, and the outer-diameter dimension of the portion of the outer-circumferential surface of the shaft member onto which the first inner ring is press-fitted in the state before the first inner ring is press-fitted onto the shaft member is larger than the outer-diameter dimension of the portion of the outer-circumferential surface of the shaft member onto which the second inner ring is press-fitted in the state before the second inner ring is press-fitted onto the shaft member.

3. The double-row tapered-roller bearing unit according to claim 2, wherein a spacer is held on the stepped section between the small-diameter-side end surface of the first inner ring and the small-diameter-side end surface of the second inner ring.

4. The double-row tapered-roller bearing unit according to claim 2, wherein the properties of the first inner ring and the second inner ring are essentially equivalent.

5. The double-row tapered-roller bearing unit according to claim 1, wherein the portion of the outer-circumferential surface of the shaft member onto which the first inner ring is fitted and the portion of the outer-circumferential surface of the shaft member onto which the second inner ring is fitted define a continuous single cylindrical surface, and the inner-diameter dimension of the first inner ring in the state before the first inner ring is press-fitted onto the shaft member is smaller than the inner-diameter dimension of the second inner ring in the state before the second inner ring is press-fitted onto the shaft member.

6. The double-row tapered-roller bearing unit according to claim 5, wherein the first inner ring has an R chamfer section in the continuous section between the inner-circumferential surface and the large-diameter-side end surface;

the second inner ring has an R chamfer section in the continuous section between the inner-circumferential surface and the large-diameter-side end surface that has a larger radius of curvature than that of the R chamfer section of the first inner ring, or has a C chamfer section that has a width dimension in the axial direction and width dimension in the radial direction that are larger than the radius of curvature of the R chamfer section of the first inner ring; and the shaft member has a rotating-side flange for supporting and fastening a wheel in a portion of the outer-circumferential surface that is adjacent to the other side in the axial direction of the portion onto which the second inner ring is press-fitted, and has a corner R section that is arc shaped in the cross section and that is located in the connecting section between the outer-circumferential surface of the shaft member and one side surface in the axial direction of the rotating-side flange in a position that faces the R chamfer section or C chamfer section of the second inner ring, and smoothly connects these surfaces.

7. A method for manufacturing a double-row tapered-roller bearing unit, the double-row tapered-roller bearing unit comprising:

an outer-diameter-side raceway member having a first outer-ring raceway and a second outer-ring raceway formed on the inner-circumferential surface thereof, the first outer-ring raceway and the second outer-ring raceway having partial conical surfaces inclined in directions so that the diameters become larger going in directions away from each other in the axial direction;

an inner-diameter-side raceway member having a first inner-ring raceway and a second inner-ring raceway formed on the outer-circumferential surface thereof, the first inner-ring raceway and the second inner-ring raceway having partial conical surfaces inclined in directions so that the diameters become larger going in directions away from each other in the axial direction; and plural tapered rollers rotatably provided respectively between the first outer-ring raceway and the first inner-ring raceway, and between the second outer-ring raceway and the second inner-ring raceway; and the inner-diameter-side raceway member comprising a first inner ring with the first inner-ring raceway formed on the outer-circumferential surface thereof, a second inner ring with the second inner-ring raceway formed on the outer-circumferential surface thereof, and a shaft member; the first inner ring and the second inner ring press-fitted onto the shaft member, and the first inner ring and the second inner ring connected and fastened to the shaft member by securing the large-diameter-side end surface of the first inner ring by a crimped section formed by elastically deforming one end section in the axial direction of the shaft member; and the method comprising a step of:

by adjusting the inclination angle $\theta_1$ of the first inner-ring raceway in the state before the first inner ring is press-fitted onto the shaft member, the inclination angle $\theta_2$ of the second inner-ring raceway in the state before the second inner ring is press-fitted onto the shaft member, the amount of decrease $\delta\theta_a$ in the inclination angle of the first inner-ring raceway occurring when the first inner ring is press-fitted onto the shaft member, the amount of decrease $\delta\theta_b$ in the inclination angle of the second inner-ring raceway occurring when the second inner ring is press-fitted onto the shaft member, and the amount of increase $\delta\theta_k$ in the inclination angle of the first inner-ring raceway occurring when the crimped section is formed, so that the inclination angle $\phi_1$ of the first inner-ring raceway and the inclination angle $\Theta_2$ of the second inner-ring raceway in the state after the crimped section has been formed are both kept within respective proper ranges.

8. The method for manufacturing a double-row tapered-roller bearing unit according to claim 7, wherein the adjustment is performed so that the inclination angle $\theta_1$ and the inclination angle $\theta_2$ are essentially equal, and so that the equation:

$$\delta\theta_a(\Delta X_1) - \delta\theta_b(\Delta X_2) = \delta\theta_k$$

is satisfied.

9. The method for manufacturing a double-row tapered-roller bearing unit according to claim 7, wherein the amount of decrease $\delta\theta_a$ in the inclination angle is adjusted by adjusting the press-fit interference $\Delta X_1$ of the first inner ring with respect to the shaft member; and the amount of decrease $\delta\theta_b$ in the inclination angle is adjusted by adjusting the press-fit interference $\Delta X_2$ of the second inner ring with respect to the shaft member.

10. The method for manufacturing a double-row tapered-roller bearing unit according to claim 9, wherein the press-fit interferences $\Delta X_1$, $\Delta X_2$ are each adjusted by making the inner-diameter dimension of the first inner ring in the state before the first inner ring is press-fitted onto the shaft member, and the inner-diameter dimension of the second inner ring in the state before the second inner ring is press-fitted onto the shaft member essentially the same; and by providing a stepped section between the portion of the outer-circumferential surface of the shaft member onto which the first inner ring is press-fitted and the portion onto which the second inner ring is press-fitted, making the outer-diameter dimension of the portion of the outer-circumferential surface of the shaft member onto which the first inner ring is press-fitted in the state before the first inner ring is press-fitted onto the shaft member larger than the outer-diameter dimension of the portion of the outer-circumferential surface of the shaft member onto which the second inner ring is press-fitted in the state before the second inner ring is press-fitted onto the shaft member.

11. The method for manufacturing a double-row tapered-roller bearing unit according to claim 10, wherein a spacer is held on the stepped section between the small-diameter-side end surface of the first inner ring and the small-diameter-side end surface of the second inner ring.

12. The method for manufacturing a double-row tapered-roller bearing unit according to claim 9, wherein the portion of the outer-circumferential surface of the shaft member onto which the first inner ring is fitted and the portion of the outer-circumferential surface of the shaft member onto which the second inner ring is fitted define a continuous single cylindrical surface, and the press-fit interferences $\Delta X_1$, $\Delta X_2$ are each adjusted by making the inner-diameter dimension of the first inner ring in the state before the first inner ring is press-fitted onto the shaft member smaller than the inner-diameter dimension of the second inner ring in the state before the second inner ring is press-fitted onto the shaft member.

13. The method for manufacturing a double-row tapered-roller bearing unit according to claim 7, wherein the properties of the first inner ring and the second inner ring are made to be essentially equivalent.

14. The method for manufacturing a double-row tapered-roller bearing unit according to claim 12, wherein an R chamfer section is provided in the continuous section between the inner-circumferential surface and the large-diameter-side end surface of the first inner ring;

an R chamfer section having a larger radius of curvature than that of the R chamfer section of the first inner ring, or a C chamfer section having a width dimension in the axial direction and width dimension in the radial direction that are larger than the radius of curvature of the R chamfer section of the first inner ring is provided in the continuous section between the inner-circumferential surface and the large-diameter-side end surface of the second inner ring; and a rotating-side flange for supporting and fastening a wheel is provided in a portion of the outer-circumferential surface of the shaft member that is adjacent to the other side in the axial direction of the portion onto which the second inner ring is press-fitted, and a corner R section that is arc shaped in the cross section is provided in the continuous section between the outer-circumferential surface of the shaft member and one side surface in the axial direction of the rotating-side flange in a position that faces the R chamfer section or C chamfer section of the second inner ring, and smoothly connects these surfaces.

* * * * *